(12) United States Patent
Jung et al.

(10) Patent No.: US 12,741,832 B2
(45) Date of Patent: Sep. 22, 2026

(54) ROBOT ARM DEVICE AND CARGO UNLOADING AUTOMATION MACHINE HAVING THE SAME

(71) Applicant: STC ENG CO.,LTD., Pyeongtaek-si (KR)

(72) Inventors: Byung Jin Jung, Hwaseongsi (KR); Jong Sam Park, Hwaseongsi (KR); Byung Taek Jung, Osan-si (KR)

(73) Assignee: STC ENG CO.,LTD., Pyeongtaek-si (KR)

( * ) Notice: Subject to any disclaimer, the term of this patent is extended or adjusted under 35 U.S.C. 154(b) by 373 days.

(21) Appl. No.: 18/286,226

(22) PCT Filed: May 22, 2023

(86) PCT No.: PCT/KR2023/006952
§ 371 (c)(1),
(2) Date: Oct. 10, 2023

(87) PCT Pub. No.: WO2024/242211
PCT Pub. Date: Nov. 28, 2024

(65) Prior Publication Data

US 2025/0083910 A1 Mar. 13, 2025

(51) Int. Cl.
*B65G 67/24* (2006.01)

(52) U.S. Cl.
CPC ...... *B65G 67/24* (2013.01); *B65G 2201/0235* (2013.01)

(58) Field of Classification Search
CPC ......... B25J 9/06; B25J 15/0052; B65G 59/02; B65G 67/08; B65G 67/26; B65G 67/28; B65G 67/24
See application file for complete search history.

(56) References Cited

U.S. PATENT DOCUMENTS

| | | | | |
|---|---|---|---|---|
| 10,029,374 | B2 * | 7/2018 | McCollum | B65G 67/20 |
| 2014/0205403 | A1 * | 7/2014 | Criswell | B65G 67/24 414/809 |
| 2017/0096308 | A1 * | 4/2017 | Girtman | B25J 9/0093 |
| 2018/0086575 | A1 * | 3/2018 | McCarthy | B65G 41/002 |
| 2020/0399076 | A1 | 12/2020 | Condon et al. | |
| 2021/0187727 | A1 * | 6/2021 | Azuma | B25J 5/007 |
| 2023/0062676 | A1 * | 3/2023 | Patil | B25J 9/0084 |
| 2023/0106508 | A1 * | 4/2023 | Allen | B25J 9/1682 700/225 |

(Continued)

FOREIGN PATENT DOCUMENTS

| | | | | |
|---|---|---|---|---|
| CN | 111874666 A | * | 11/2020 | B65G 67/24 |
| CN | 115027969 A | * | 9/2022 | B65G 67/24 |

(Continued)

*Primary Examiner* — Kaitlin S Joerger
(74) *Attorney, Agent, or Firm* — Park, Kim & Suh, LLC

(57) ABSTRACT

A robot arm device and an automated machine for unloading cargo including the robot arm device are provided. The automated machine for unloading loaded cargo from a cargo box includes a main body frame, and robot arm devices provided at opposite side portions of the main body frame. The robot arm device includes arm units provided at the opposite side portions of the main body frame to be rotatable in a multi-axis and movable forward and rearward, and a hand unit linked to the arm unit to unload the cargo in contact with the cargo.

12 Claims, 16 Drawing Sheets

(56) References Cited

U.S. PATENT DOCUMENTS

| | | | | |
|---|---|---|---|---|
| 2025/0214792 | A1 * | 7/2025 | Warrier | B65G 67/08 |

FOREIGN PATENT DOCUMENTS

| | | | | | |
|---|---|---|---|---|---|
| CN | 115056252 | A | * | 9/2022 | B25J 15/0253 |
| JP | H08-073047 | A | | 3/1996 | |
| JP | 2001-122437 | A | | 5/2001 | |
| JP | 2002-167045 | A | | 6/2002 | |
| KR | 10-0183709 | B1 | | 5/1999 | |
| KR | 10-2021-0044845 | A | | 4/2001 | |
| KR | 10-2022-0081084 | A | | 6/2022 | |
| KR | 20220081084 | A | * | 6/2022 | B65G 21/12 |
| KR | 102523374 | B1 | * | 4/2023 | B65G 21/12 |
| KR | 10-2023-0072391 | A | | 5/2023 | |
| WO | WO-2019177457 | A1 | * | 9/2019 | B65G 47/918 |
| WO | WO-2024244356 | A1 | * | 12/2024 | B65G 57/03 |

* cited by examiner

7.Lower most box picking (b)

(c)

ROBOT ARM DEVICE AND CARGO UNLOADING AUTOMATION MACHINE HAVING THE SAME

CROSS-REFERENCE TO RELATED APPLICATIONS

This application is the National Stage filing under 35 U.S.C. 371 of International Application No. PCT/KR2023/006952, filed on May 22, 2023, the contents of which are all hereby incorporated by reference herein in their entirety.

TECHNICAL FIELD

An embodiment of the inventive concept relates to an automation technology for unloading cargo. The inventive concept is derived from research conducted as part of Robot Industry Core Technology Development Project-wide Cooperation Robot Product Technology (Project No.; 1415168943, Project No.; 20009109, Research project name; Development of a Unloading work system by arterial cargo logistics transport vehicle using robots, Project management institution; STC Engineering Co., Ltd., and Research period; 2020.05.01 to 2024.12.31) by the Ministry of Trade, Industry and Energy.

BACKGROUND ART

Recently, for the past three years, the volume of parcel delivery has increased by 10% to 13% every year, but the average delivery unit price has fallen by 2% to 3% every year, which makes automation as a very important task in logistics industry to maintain corporate competitiveness. Currently, most part of the delivery process has employed automation in a distribution center using equipment such as belt sorter, but an unloading task of unloading various delivery cargo from a cargo box of autonomous vehicle relies on manual work.

In addition, to handle the nationwide daily demand for parcel delivery, an arterial truck at a hub terminal usually loads about 2,000 cargoes per unit, and two workers have to unload all cargo within an hour. This work is the most intense work of the various tasks of a delivery hub terminal, so workers avoid the work. Accordingly, there has been required the development of a robot system that automates the unloading work of an arterial cargo truck.

DETAILED DESCRIPTION OF THE INVENTION

Technical Problem

The inventive concept is to provide a robot arm device and an automated machine for unloading cargo, capable of recognizing the cargo in a cargo box, and automatically unloading the cargo.

Meanwhile, the technical problems that are achieved in the inventive concept may not be limited to what has been described herein, and other technical problems not described herein may be clearly understood from the following detailed description by persons skilled in the art.

Technical Solution

According to an embodiment of the inventive concept, an automated machine for unloading cargo loaded from a cargo box, includes a main body frame, and robot arm devices provided at opposite side portions of the main body frame. The robot arm device includes arm units provided at the opposite side portions of the main body frame to be rotatable in a multi-axis and movable forward and rearward, and a hand unit linked to the arm unit to unload the cargo in contact with the cargo.

The hand unit may include an unloading conveyor belt provided at one side portion of the hand unit to sweep down loaded cargo, as the unloading conveyor belt rotates toward the main body frame, a suction unit provided at an opposite side portion of the hand unit to suction and unload the loaded cargo, and a clamp unit provided at the opposite side portion of the hand unit to pick up and unload the loaded cargo.

The hand unit further may include a roughness pattern part formed on a surface of the unloading conveyor belt to increase frictional force with the loaded cargo.

The suction unit and the clamp unit may be arranged vertically at the opposite side portion of the hand unit, and provided in a longitudinal direction of the hand unit.

The suction unit may include a suction pad unit including at least one suction cup provided at an end portion of the suction pad unit to vacuum-suction the cargo, and provided in the longitudinal direction of the hand unit, and a suction driving unit linked to the suction pad unit and provided to move the suction pad unit forward and rearward.

The clamp unit may include a clamping section provided in a form of a tong such that an end portion of the clamping section picks up the cargo and provided in a longitudinal direction of the hand unit, and a clamp driving section linked to the clamping section and provided to move the clamping section forward and rearward.

The robot arm device may determine one unloading mode of a down sweep mode, a side sweep mode, a suction mode, and a clamping mode, based on at least one of a distance to the cargo, a loaded pattern of the cargo, a loaded position of the cargo, and a type of the cargo.

The robot arm device may rotate the unloading conveyor belt toward the main body frame and sweep down the cargo, in a state that the unloading conveyor belt is placed to face the cargo above the cargo, in the down sweep mode.

The robot arm device may rotate a pair of the unloading conveyor belts toward the main body frame and sweep down the cargo, in a state that the loaded cargo is interposed between the pair of the unloading conveyor belts, and the pair of the unloading conveyor belts are placed to face the cargo at opposite side portions of the cargo, in the side sweep mode.

A pair of robot arm devices may be bent inward while consecutively operating in the side sweep mode, as cargoes are unloaded between the pair of the unloading conveyor belts in the side sweep mode.

The robot arm device may be provided to unload the cargo, after suctioning the cargo through the suction unit in the suction mode.

The robot arm device may be provided to unload the cargo, after picking up the cargo through the clamping unit in the clamping mode.

The hand unit may include an unloading conveyor belt provided to sweep down the cargo in contact with the hand unit, as the unloading conveyor belt rotates toward the main frame.

According to an embodiment of the inventive invention, a robot arm device to unload cargo loaded in a cargo box, may include an arm unit provided to rotate in multiple axes and to move forward and rearward, and a hand unit linked to the arm unit to unload the cargo in contact with the cargo. The hand unit may include an unloading conveyor belt provided to sweep down cargo making contact with the hand unit, as the unloading conveyor belt rotates in a specific direction.

Advantageous Effects of the Invention

According to an embodiment of the inventive concept, the automated machine for unloading cargo has a pair of robot arm devices which is rotatable or movable in multiple axes, and the robot arm device includes the conveyor belt for unloading, the suction unit, and the clamping unit. Accordingly, as the robot arm device may operate in various unloading modes such as the down sweep mode, the side sweep mode, the suction mode, and the clamping mode, depending on the position of loaded cargo, the loaded pattern of the cargo, and the type of the cargo, such that the loaded cargo may be easily and rapidly unloaded.

Meanwhile, the effects produced by the inventive concept are not limited to the aforementioned effects, and any other effects not mentioned herein will be clearly understood from the following description by those skilled in the art to which the inventive concept pertains.

DESCRIPTION OF THE DRAWINGS

FIGS. 1 and 2 are a front perspective view and a rear perspective view illustrating an automated machine for unloading cargo according to an embodiment of the inventive concept.

BEST MODE

Figure 1:
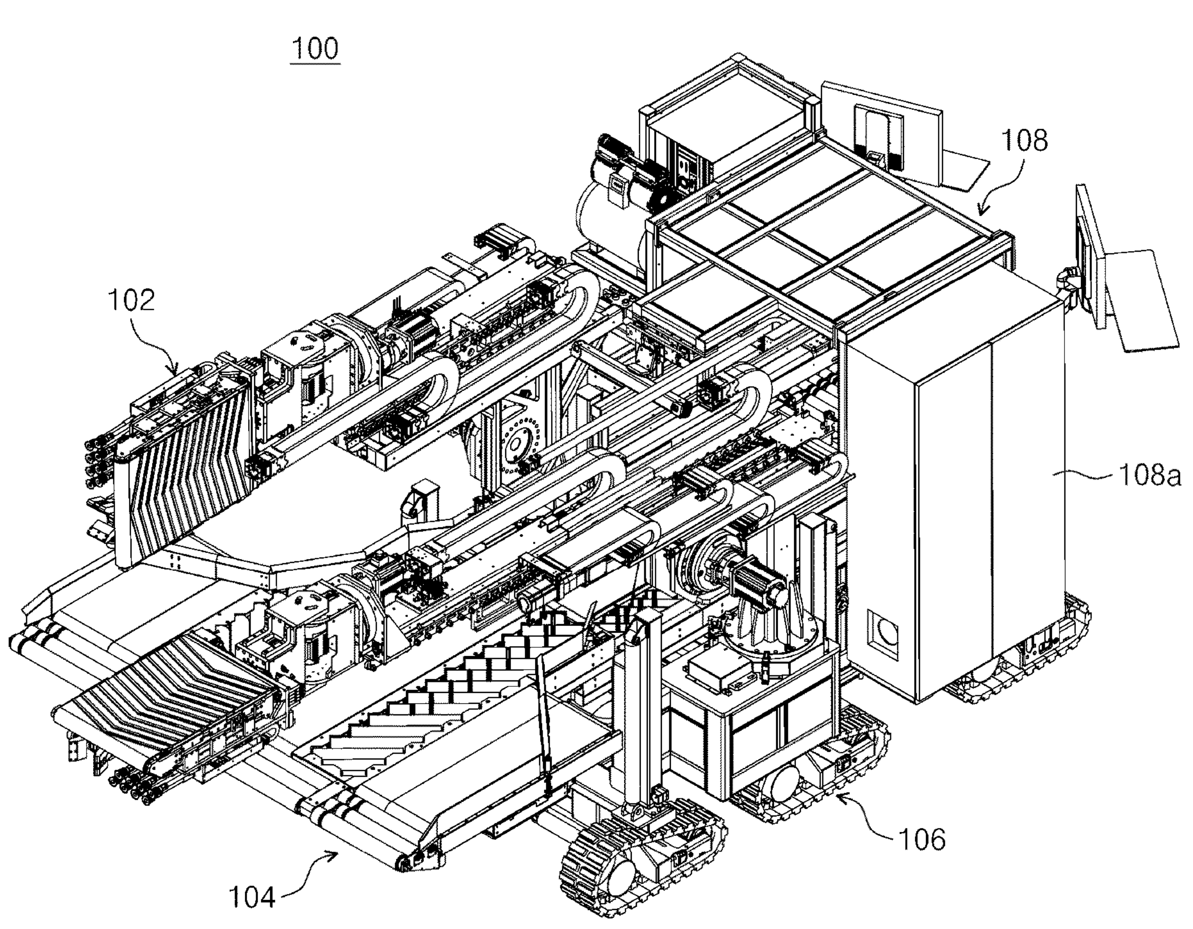

Hereinafter, an embodiment of the inventive concept will be described in more detail with reference to the accompanying drawings. The embodiments of the inventive concept may be modified in various forms, and the scope of the inventive concept should not be construed to be limited by the embodiments of the inventive concept described in the following. The embodiments of the inventive concept are provided to describe the inventive concept for those skilled in the art more completely. Accordingly, the shapes and the like of the components in the drawings are exaggerated to emphasize clearer descriptions.

Hereinafter, the feature of the inventive concept will be described in detail with reference to exemplary embodiments and accompanying drawings to clarify solutions of problems to be solved according to the inventive concept. In the following description, the same reference numerals will be assigned to the same components even though the components are illustrated in different drawings. In addition, when the description is made with reference to a present drawing, a component in another drawing may be cited if necessary.

Meanwhile, the terms “up”, “down”, “one side”, or “opposite side”, which represents directionality, are used the orientations of accompanying drawings. According to an embodiment of the inventive concept, positions of components can be set in various orientations. Accordingly, the terms related to the directionality are provided for the convenience of example, but the inventive concept is not limited thereto.

Figure 2:
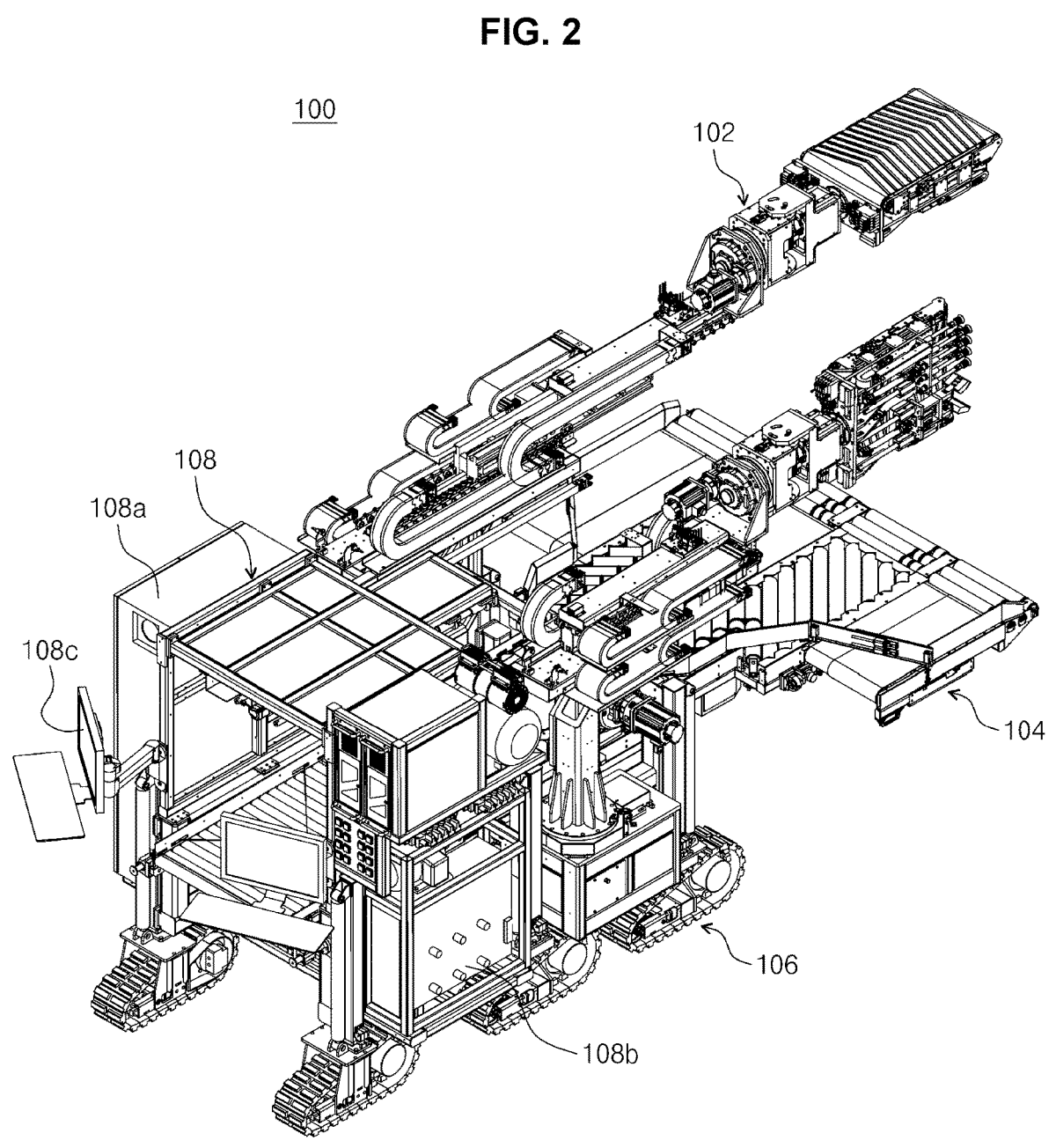
Figure 3:
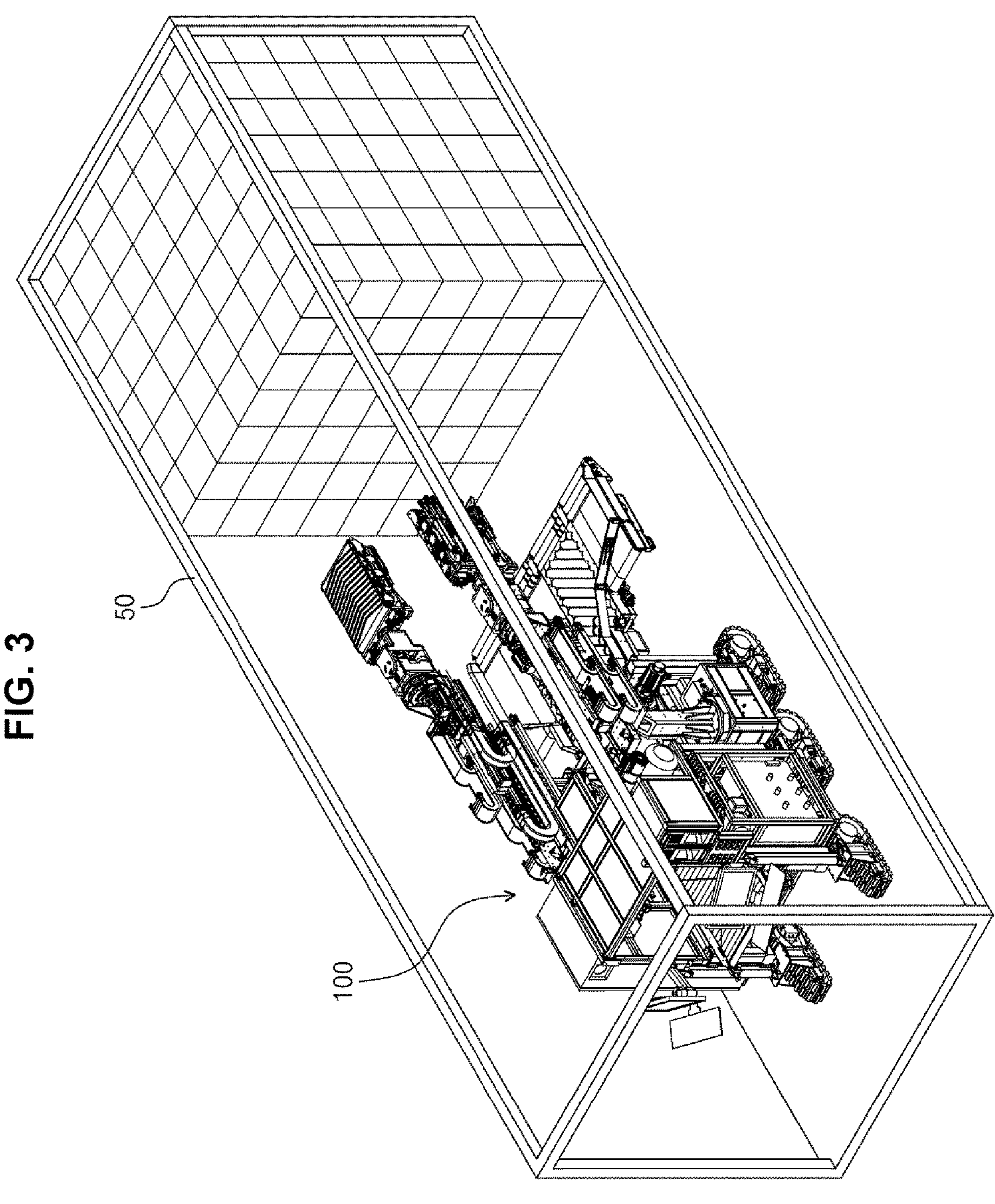
FIG. 3 is a view illustrating the state in which automated machine for unloading cargo unloads the cargo, after entering an inner part of the loading box according to an embodiment of the inventive concept.

FIGS. 1 and 2 are a front perspective view and a rear perspective view illustrating an automated machine for unloading cargo according to an embodiment of the inventive concept, and FIG. 3 is a view illustrating the state in which the automated machine for unloading cargo unloads the cargo, after entering an inner part of the loading box according to an embodiment of the inventive concept.

FIG. 1 is a front perspective view illustrating an automated machine for unloading cargo according to an embodiment of the inventive concept, and FIG. 2 is a rear perspective view illustrating an automated machine for unloading cargo according to an embodiment of the inventive concept Referring to FIGS. 1 to 3, an automated machine 100 for unloading cargo may include a robot arm device 102, a conveyor device 104, a track device 106, and a main body frame 108.

The automated machine 100 for unloading cargo is to unload and then carry the cargo (hereinafter, referred to as “loaded cargo”) loaded in the cargo box In this case, the cargo box 50 may be a cargo box or a container mounted on a cargo vehicle (for example, an arterial truck). The automated machine 100 for unloading cargo may unload the loaded cargo in the cargo box at the entrance of the cargo box 50, or may unload the loaded cargo in the cargo box 50 after entering the cargo box 50 as illustrated in FIG. 3.

In addition, the automated machine 100 for unloading cargo may include various sensor devices (for example, a vision sensor, a Lidar sensor, or a fusion sensor of a vision sensor and a Lidar sensor, or a scanner) to recognize the loaded pattern of the cargo, the loaded position of the cargo, or the type of the cargo, and thus to determine an unloading mode of the cargo.

Robot arm devices 102 may be provided at opposite sides of the main body frame 108. In other words, the robot arm devices 102 may be paired at the opposite sides of the main body frame 108. The robot arm devices 102 may be provided to operate in par, like arms of a human body, and to unload various types of cargo, such as a box, a plastic pouch, or a gunny bag, loaded in a bulk form in the cargo box The robot arm device 102 may unload the loaded cargo in the cargo box at the side of the conveyor device 104.

The conveyor device 104 may be mounted in the main body frame 108. The conveyor device 104 may be provided in a longitudinal direction of the robot arm device 102 in the main body frame 108. The conveyor device 104 may transfer the loaded cargo unloaded by the robot arm device 102 to the rear portion of the main body frame 108.

The conveyor device 104 may operate in link to the robot arm devices 102. A front end portion of the conveyor device

104 may be adjusted in height depending on the operation of the robot arm device 102. In this case, the front end portion of the conveyor device 104 may be adjusted in height depending on the height of the loaded cargo to be unloaded by the robot arm device 102.

The track device 106 may be provided at a lower portion of the main body frame 108. The track device 106 may move the automated machine 100 for unloading cargo. In other words, the track device 106 may allow the automated machine 100 for unloading cargo to move into the entrance of the cargo box or enter the cargo box.

The main body frame 108 may support the automated machine 100 for unloading cargo. The main body frame 108 may be provided in various forms to support the automated machine 100 for unloading cargo, and the form of the main body frame 108 is not limited. The main body frame 108 may be provided to support the robot arm device 102. The main body frame 108 may be provided to support the conveyor device 104. In addition, the main body frame 108 may be linked to the track device 106 at the upper portion of the track device 106.

The main body frame 108 may include an electronic parts box 108*a* including circuit devices to supply power to the automated machine 100 for unloading cargo and to control the operations of the automated machine 100 for unloading cargo. In addition, the main body frame 108 is equipped with a hydraulic pressure tank 108*b* to apply hydraulic pressure to at least one of the robot arm device 102 and the track device 106. In addition, the main body frame 108 may be equipped with at least one monitor 108*c* to identify the operation of the automated machine 100 for unloading cargo.

Figure 4:
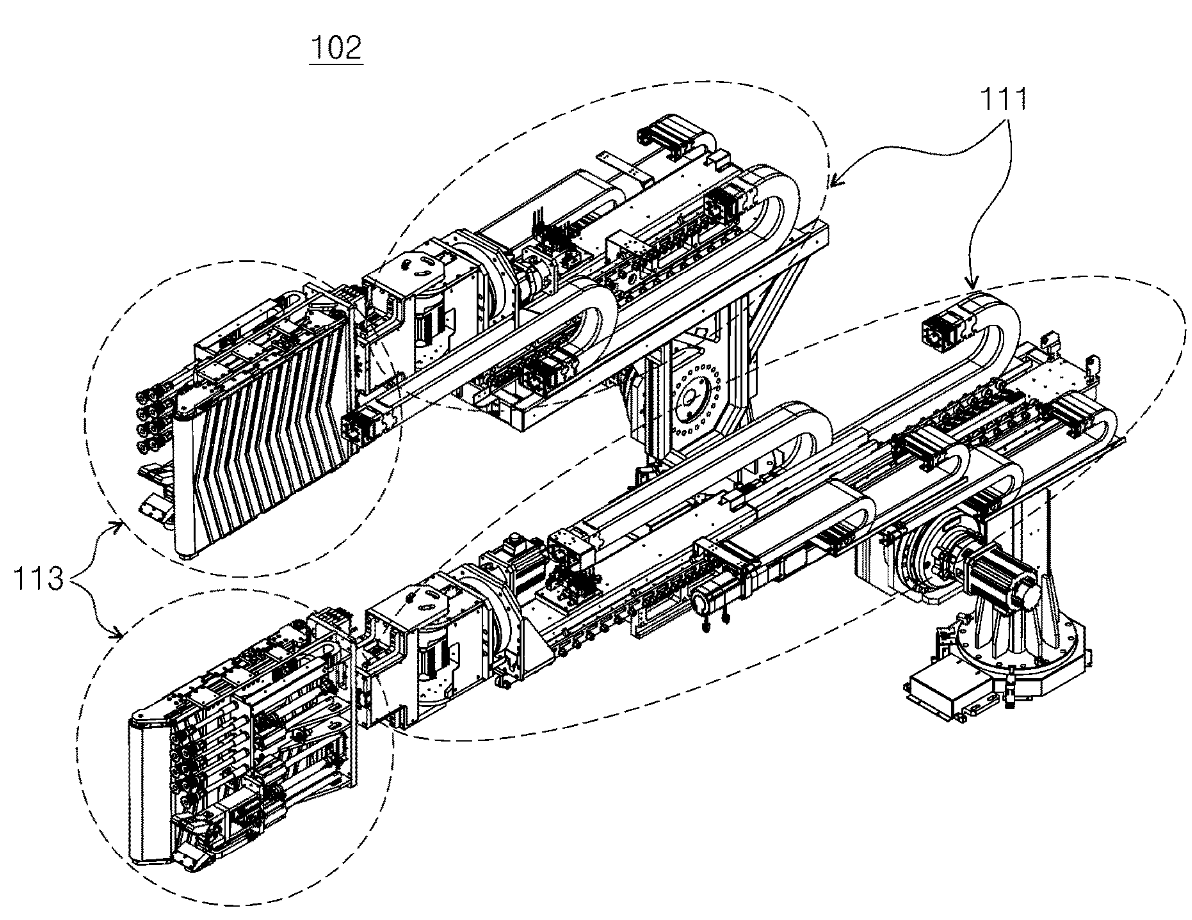
FIG. 4 is a perspective view illustrating a robot arm device according to an embodiment of the inventive concept.
Figure 5:
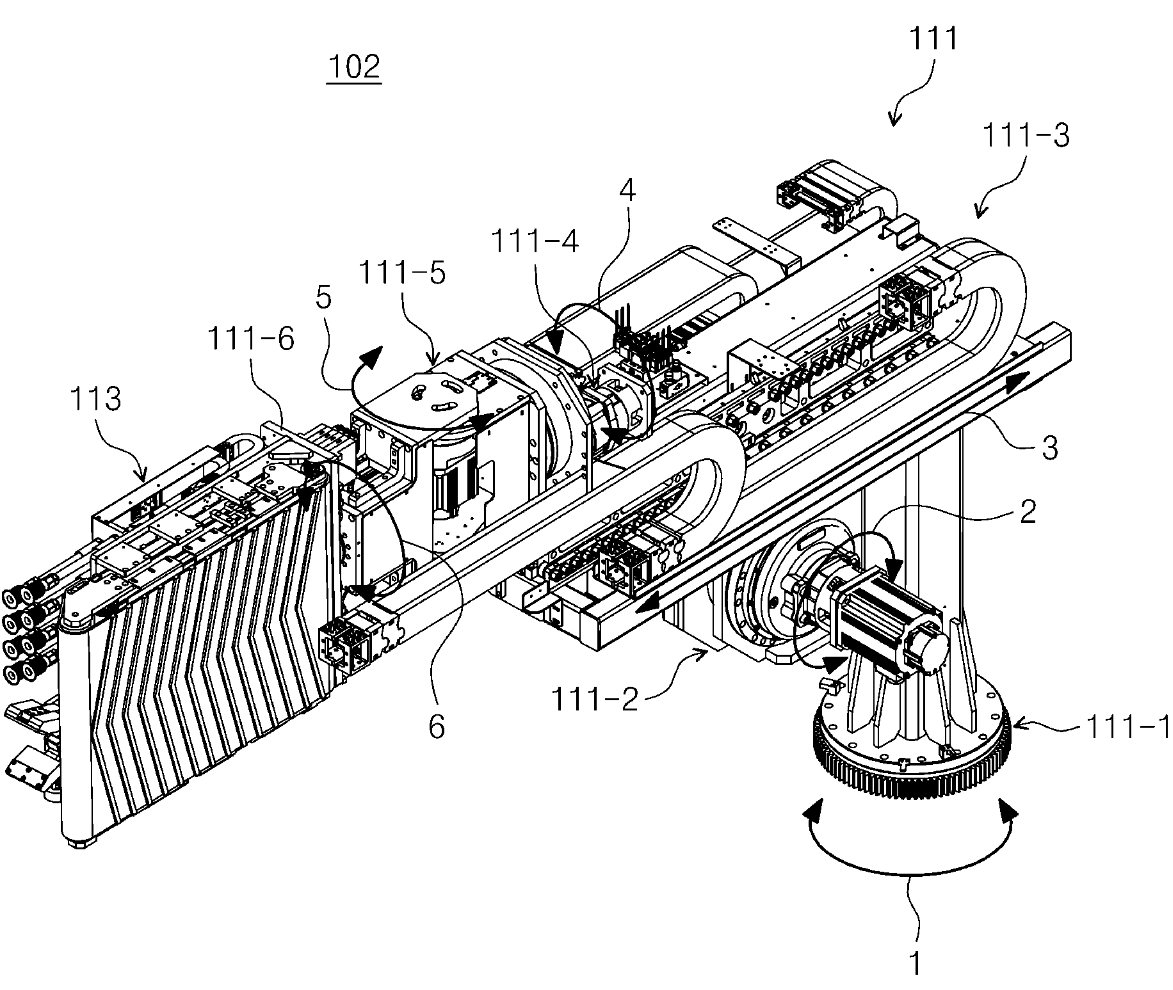
FIG. 5 is a view illustrating each axis part included in an arm unit of a robot arm device according to an embodiment of the inventive concept.

FIG. 4 is a perspective view illustrating the robot arm device 102 according to an embodiment of the inventive concept, and FIG. 5 is a view illustrating each axis part included in an arm unit of the robot arm device 102 according to an embodiment of the inventive concept.

Referring to FIGS. 4 and 5, the robot arm device 102 may include an arm unit 111 and a hand unit 113.

The automated machine 100 for unloading cargo may operate in an unloading mode determined based on at least one of the pattern of the loaded cargo in the cargo box, the loaded position of the cargo, or the type of the cargo. The unloading mode, which is an operating mode to unload the cargo from the cargo box, may include, for example, a down sweep mode, a side sweep mode, an abortion mode, and a clapping mode.

Arm units 111 may be mounted on opposite sides of the main body frame 108. The arm unit 111 may be provided to allow multi-axis rotation. In addition, the arm unit 111 may be provided to move forward and backward. The arm unit 111 may be provided to simultaneously perform multi-axis rotation and forward or backward movement.

According to an exemplary embodiment, the arm unit 111 may be provided to have a 6-axis degree of freedom. The arm unit 111 may include a first axis part 111-1, a second axis part 111-2, a third axis part 111-3, a fourth axis part 111-4, a fifth axis part 111-5, and a sixth axis part 111-6.

The first axis part 111-1 may be mounted on the main body frame 108. The first axis part 111-1 may be provided to be rotatable in the first direction 1. The second axis part 111-2 may be connected to the first axis part 111-1. The second axis part 111-2 may be provided to be rotatable in the second direction 2. The third axis part 111-3 may be provided in connection with the second axis part 111-2. The third axis part 111-3 may be provided to move forward and backward in the third direction 3.

The fourth axis part 111-4 may be provided in linked to the third axis part 111-3. The fourth axis part 111-4 may be provided to be rotatable in the fourth direction 4. The fifth axis part 111-5 may be provided in link to the fourth axis part 111-4. The fifth axis part 111-5 may be provided to be rotatable in the fifth direction 5. The sixth axis part 111-6 may be provided in link to the fifth axis part 111-5. The sixth axis part 111-6 may be provided to be rotatable in the sixth direction 6. In this case, the first direction 1 to the sixth direction 6 may be mutually different directions. In this case, the arm unit 111 may move forward or rearward while rotating in five axis directions.

The hand unit 113 may be provided to be linked to the end portion of the arm unit 111. The hand unit 113 is a part that is in contact with the loaded cargo and is a part that unloads the loaded cargo toward the conveyor device 104. The hand unit 113 may be linked to the sixth axis portion 111-6. As the hand unit 113 is connected to the arm unit 111, the hand unit 113 may move forward and backward while rotating in the direction of five axes together with the arm unit 111 depending on the operation of the arm unit 111. As described above, as the robot arm device 102 is provided to have a six-axis degree of freedom, the robot arm device 102 covers all ranges of the cargo box to unload the loaded cargo.

Figure 6:
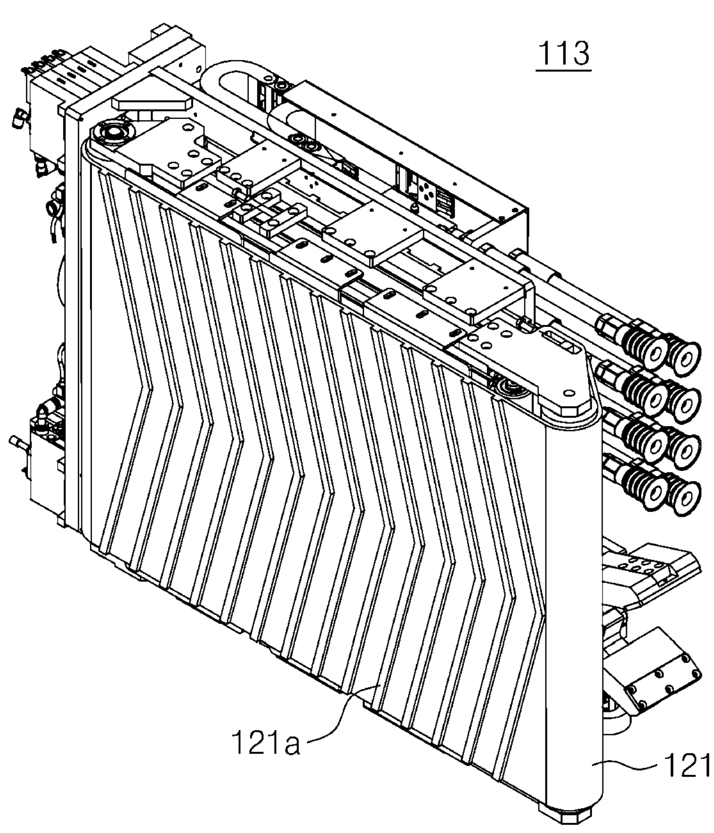
FIGS. 6 and 7 are perspective views illustrating one end portion and an opposite end portion of a hand unit according to an embodiment of the inventive concept.
Figure 7:
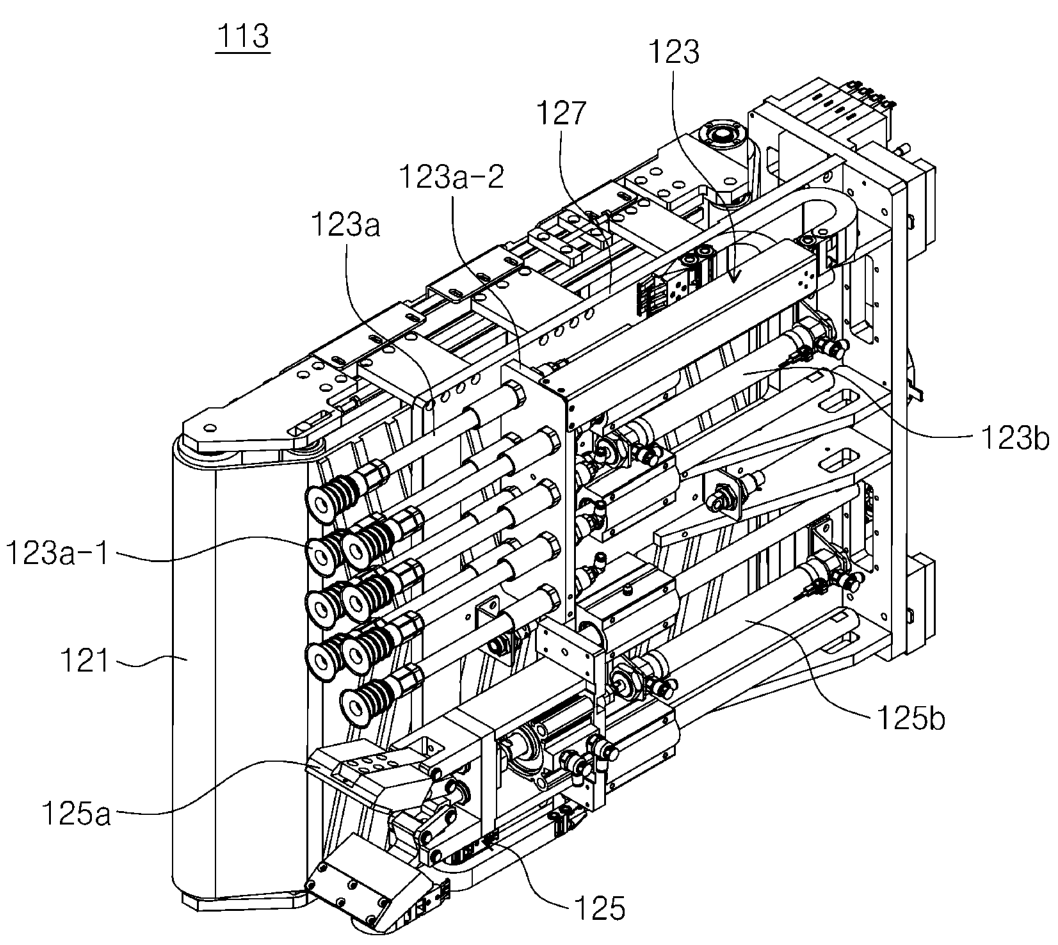

FIGS. 6 and 7 are perspective views illustrating one end portion and an opposite end portion of the hand unit 113 according to an embodiment of the inventive concept.

FIG. 6 is a view illustrating one side portion of the hand unit 113 according to an embodiment of the inventive concept, and FIG. 7 is a view illustrating an opposite side portion of the hand unit 113 according to an embodiment of the inventive concept.

Referring to FIGS. 6 and 7, the hand unit 113 may include a conveyor belt 121, a suction unit 123, and a clamp unit 125.

The conveyor belt 121 for unloading may be mounted at one side portion of the hand unit 113. When the robot arm device 102 is compared with the arm of the human body, the one side portion of the hand unit 113 may be compared to the palm. The conveyor belt 121 for unloading may be provided in the longitudinal direction of the arm unit 111. The conveyor belt 121 for unloading may be provided to be rotated in a specific direction. For example, the conveyor belt 121 for unloading may be provided in a loop form to rotate while circulating.

The conveyor belt 121 for unloading may be provided to rotate toward the main body frame 108 (that is, inward the main body frame 108). In other words, the conveyor belt 121 for unloading of each hand unit 113 in the pair of robot arm devices 102 may be provided to rotate toward the main body frame 108.

As the pair of robot arm devices 121 rotates toward the main body frame 108, loaded cargo making contact with the pair of conveyor belts 121 is unloaded toward the conveyor device 104 while sweeping down toward the main body frame 108 between the pair of conveyor belts 121. In other words, the conveyor belt 121 for unloading, which is used in a sweep mode, may be used when the unloading mode of the robot arm device 102 is a down sweep mode or a side sweep mode.

A roughness pattern part 121*a* may be formed on a surface of the conveyor belt 121 for unloading to increase the frictional force with the loaded cargo, when the loaded cargo is sweep down. Although the roughness pattern part 121*a* may be provided in a protruding form on the surface of the conveyor belt 121 for unloading, the inventive concept is not limited thereto. A plurality of roughness pattern parts 121*a* may be provided at a uniform distance in the longitudinal direction of the conveyor belt 121 for unloading.

Each of the suction unit 123 and the clamp unit 125 may be provided at an opposite side portion of the hand unit 113. When the robot arm device 102 is compared to the arm of the human body, the opposite side portion of the hand unit 113 may be compared to the back of the hand of the human body. Each of the suction unit 123 and the clamp unit 125 may be provided in a vertical direction at the opposite side portion of the hand unit 113. Each of the suction unit 123 and the clamp unit 125 may be provided in the longitudinal direction of the hand unit 113.

According to an embodiment, the suction unit 123 and the clamp unit 125 may be mounted at the hand unit 113 through a hand bracket 127. Opposite sides of the hand bracket 127 may be fixed to opposite sides of the conveyor belt 121 for unloading. The hand bracket 127 may be provided between the conveyor belt 121 for unloading, the suction unit 123, and the clamp unit 125.

The suction unit 123 may suction the loaded cargo in the cargo box and unload the loaded cargo. In other words, the suction unit 123 may be used when the unloading mode of the robot arm device 102 is a suction mode. For example, the suction unit 123 may be provided to move forward and rearward in the longitudinal direction of the hand unit 113. The suction unit 123 may include a suction pad unit **123*a* and a suction driving unit 123*b***.

The suction pad unit **123*a* is a part to suction the loaded cargo. A plurality of suction pad units 123*a* may be provided. One end terminal of the suction pad unit 123*a* may be fixed on a mounting plate 123*a*-2. The mounting plate 123*a*-2 may be linked to the suction driving unit 123*b* In this case, although the plurality of suction pad units 123*a*** are provided, the inventive concept is not limited thereto.

A suction cup **123*a*-1 for vacuum-suction may be provided at the end portion of the suction pad unit 123*a* to vacuum-suction the loaded cargo. The suction cup 123*a*-1** may be provided in the form of a bellows to be folded in various directions, but the form is not limited thereto.

The suction driving unit **123*b* may be provided to allow the suction pad unit 123*a* to move forward or rearward. In addition, the suction driving unit 123*b* may include a vacuum generator allowing the suction pad unit 123*a*** to suction the loaded cargo.

Figure 8:
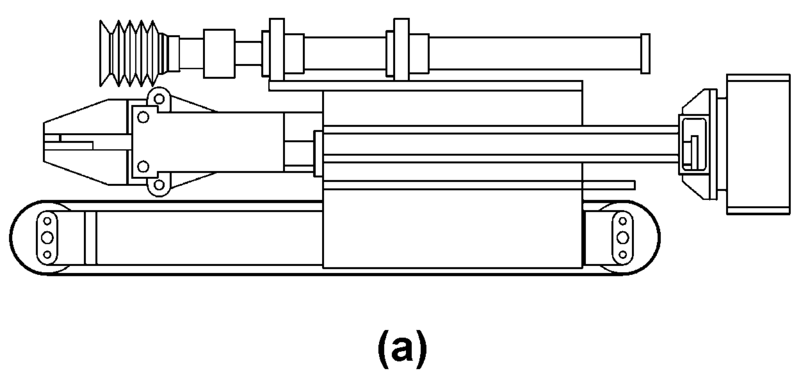
FIG. 8 is a view illustrating the state in which a suction pad unit moves forward according to an embodiment of the inventive concept.
Figure 8:
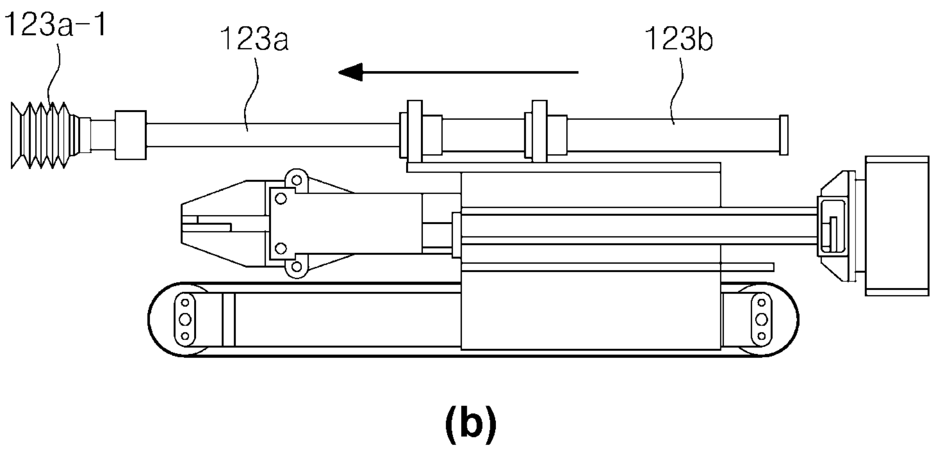

FIG. 8 is a view illustrating that the suction pad unit **123*a*** to move forward according to an embodiment of the inventive concept.

FIG. 8A is a view illustrating the state of the suction pad unit **123*a*, before the suction pad unit 123*a* moves forward according to an embodiment of the inventive concept, and FIG. 8B is a view illustrating the state of the suction pad unit 123*a*, after the suction pad unit 123*a*** moves forwards according to an embodiment of the inventive concept.

Referring to FIGS. 8A and 8B, the suction driving unit **123*b* may allow the suction pad unit 123*a* to move forward in the suction mode to suction the loaded cargo. The suction driving unit 123*b* may allow the suction pad unit 123*a*** to move rearward after unloading the suctioned loaded cargo and to be returned to an original position.

In this case, although the suction pad unit **123*a* moves forward to suction the loaded cargo, the inventive concept is not limited thereto. For example, the hand unit 111 moves toward the loaded cargo in the state that the suction pad unit 123*a* is fixed and then suctions the loaded cargo through the suction pad unit 123*a***.

The clamp unit 125 may pick up the loaded cargo in the cargo box and unload the loaded cargo. In other words, the clamp unit 125 may be used when the unloading mode of the robot arm device 102 is a clamping mode. For example, the clamp unit 125 may be provided to move forward and rearward in the longitudinal direction of the hand unit 113. The clamp unit 125 may include a clamping section **125*a* and a clamp driving section 125*b***.

The clamping section **125*a* is a part to pick up the loaded cargo. In this case, the type of the loaded cargo may be a gunny bag. In other words, the clamping section 125*a* may be provided to pick up a gunny bag of the loaded cargo. To this end, the end portion of the clamping section 125*a* may be provided in the form of a tong. The clamp driving section 125*b* may be provided to allow the clamping section 125*a*** to move forward or rearward.

Figure 9:
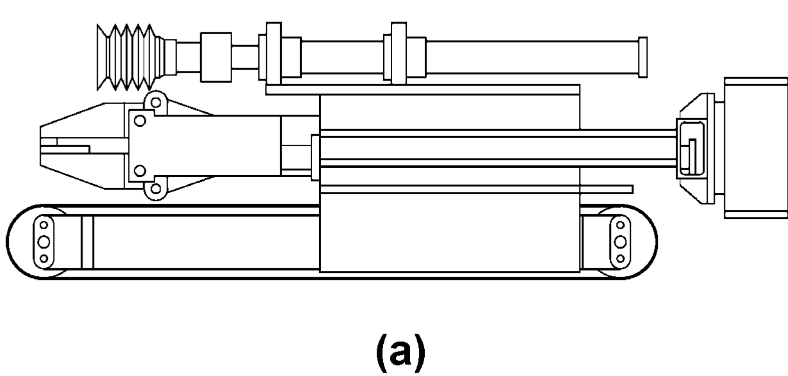
FIG. 9 is a view illustrating the state in which a clamping section moves forward according to an embodiment of the inventive concept.
Figure 9:
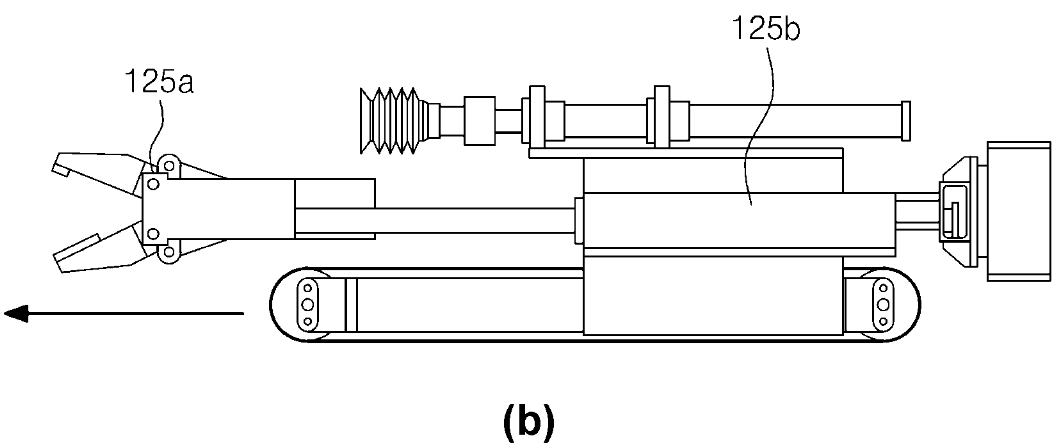

FIG. 9 is a view illustrating the state that the clamping section **125*a*** moves forward according to an embodiment of the inventive concept.

FIG. 9A is a view illustrating the state of the clamping section **125*a*, before the clamp unit 125*a* moves forward according to an embodiment of the inventive concept, and FIG. 9B is a view illustrating the state of the clamping section 125*a*, after the clamping section 125*a*** moves forwards according to an embodiment of the inventive concept.

Referring to FIGS. 9A and 9B, the clamp driving section **125*b* may allow the clamping section 125*a* to move forward in the clamping mode to clamp the loaded cargo. The clamp driving section 125*b* may allow the clamping section 125*a*** to move rearward after unloading the loaded cargo and to be returned to an original position.

In this case, although the clamping section **125*a* moves forward to clamp the loaded cargo, the inventive concept is not limited thereto. For example, the hand unit 111 moves toward the loaded cargo in the state that the clamping section 125*a* is fixed and then clamps the loaded cargo through the clamping section 125*a***.

FIGS. 10 to 16 are views illustrating the operation in which the automated machine for unloading cargo unloads the loaded cargo from the cargo box according to an embodiment of the inventive concept.

Figure 10:
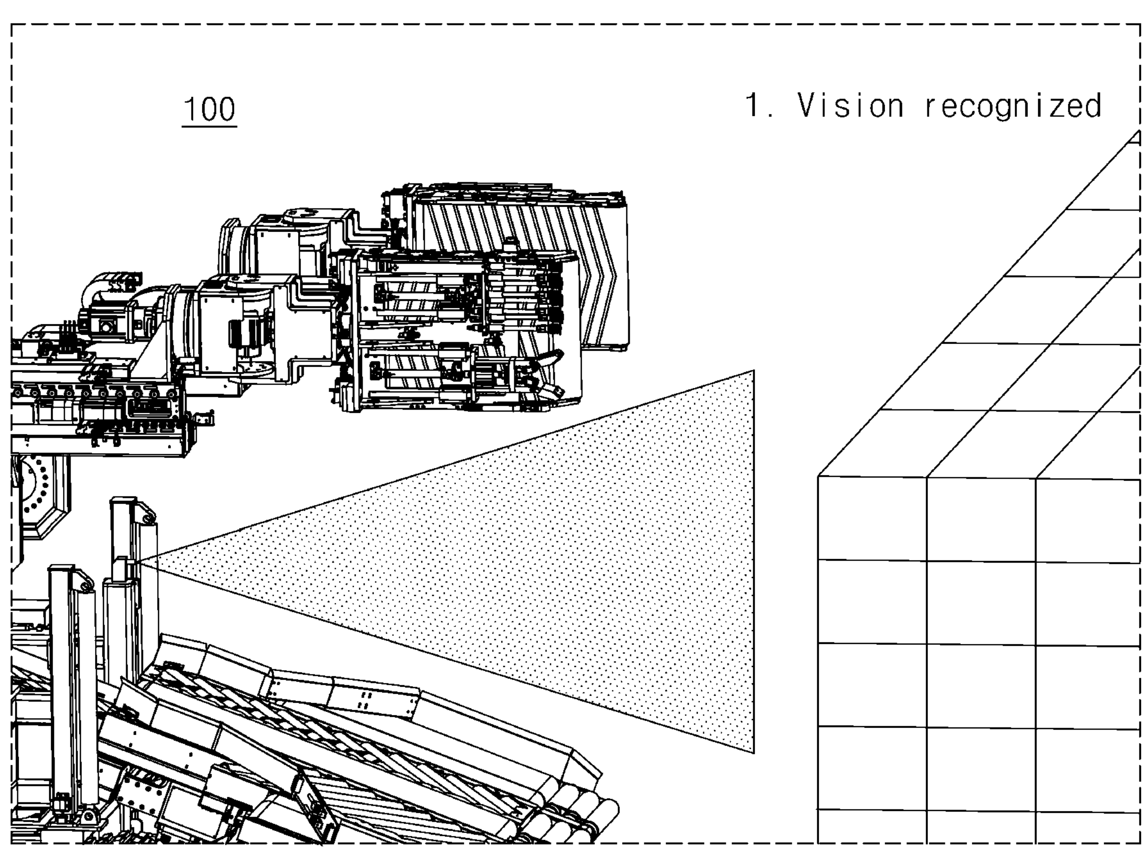
FIGS. 10 to 16 are views illustrating the operation in which automated machine for unloading cargo unload loaded cargo from a cargo box according to an embodiment of the inventive concept.
Figure 11:
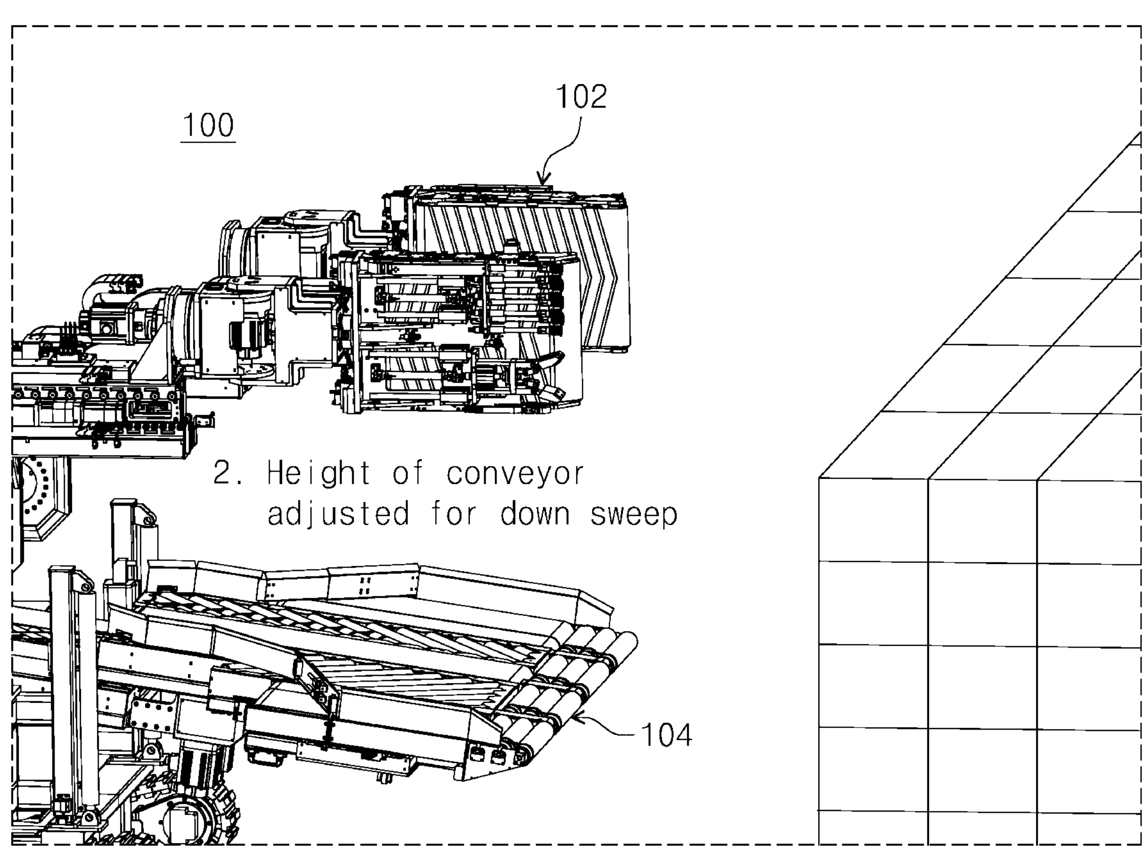
Figure 12:
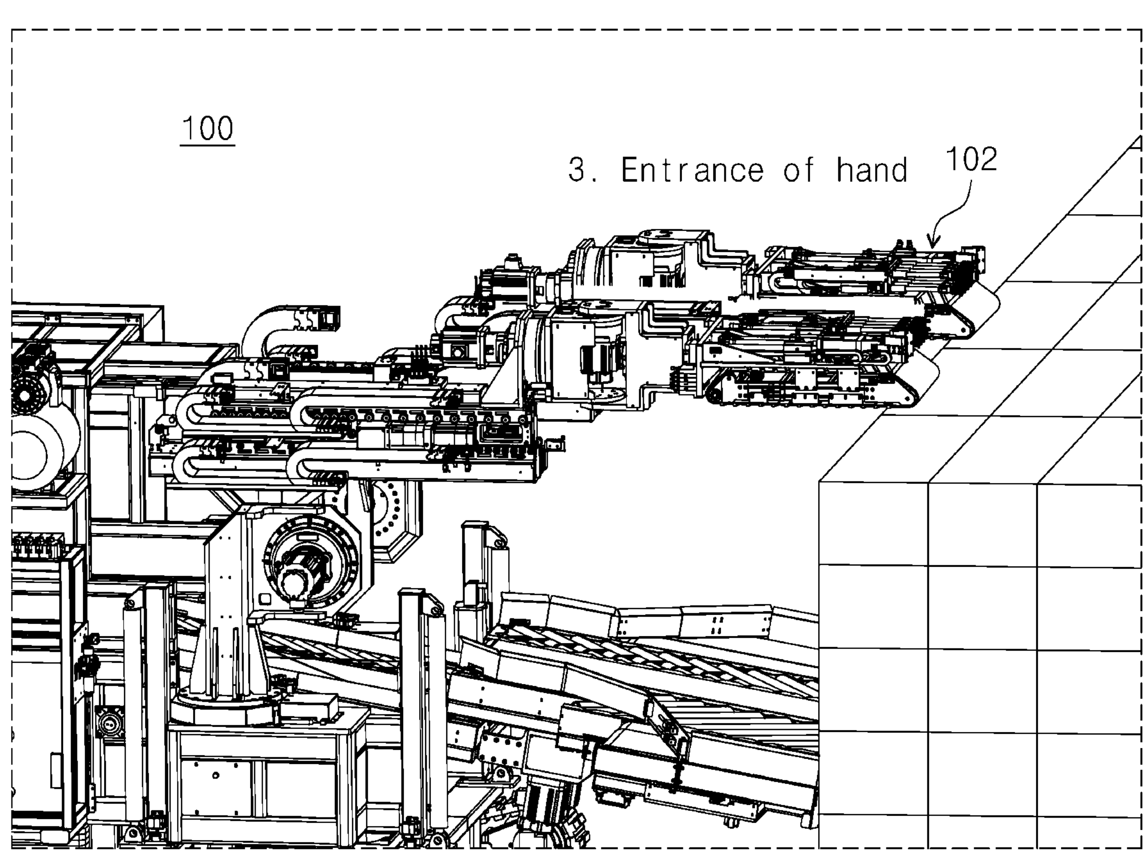
Figure 13:
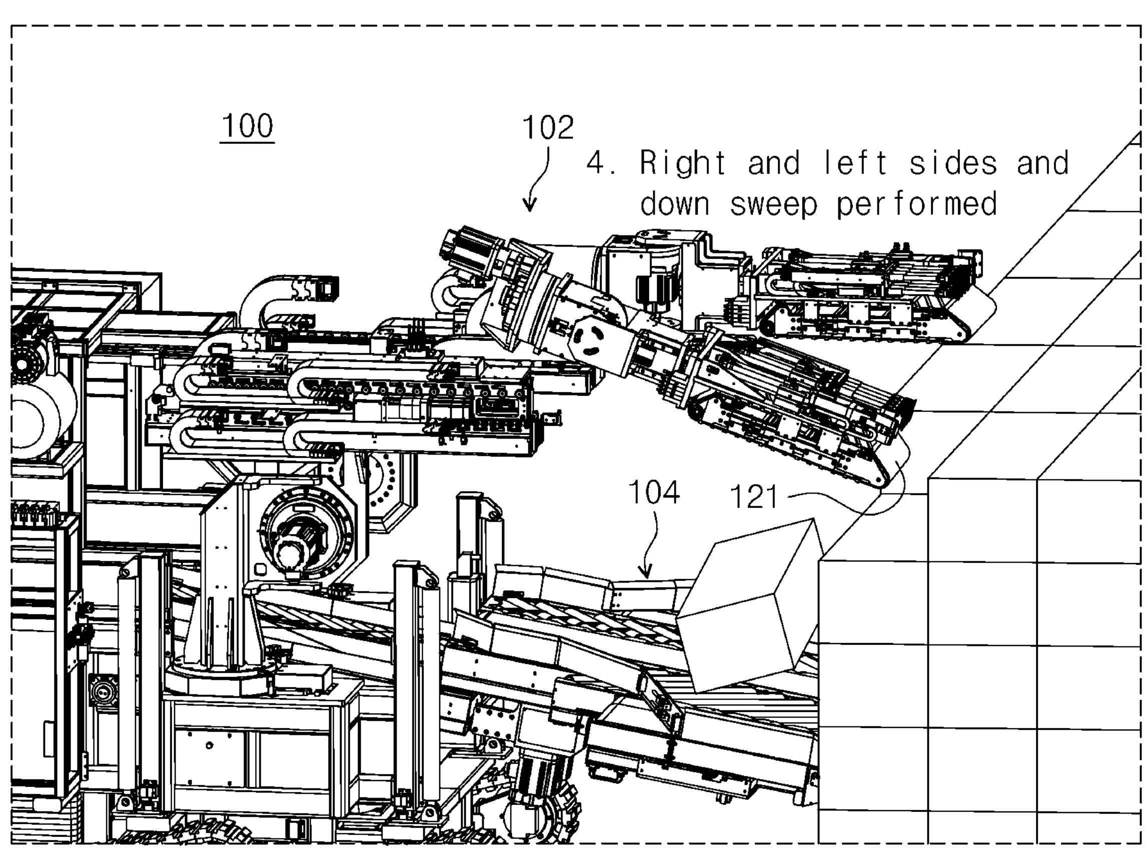
Figure 14:
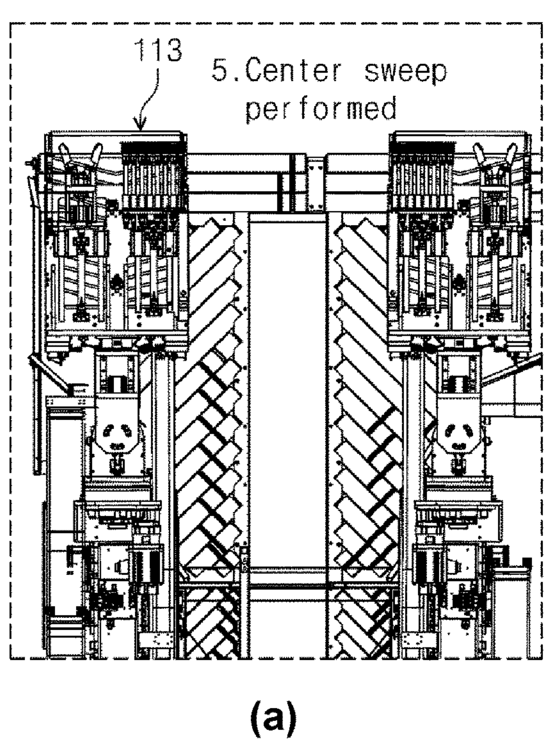
Figure 14:
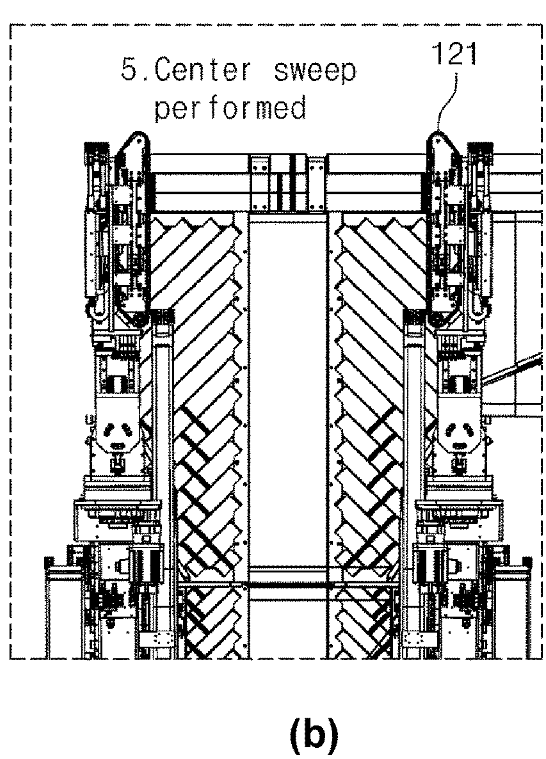
Figure 14:
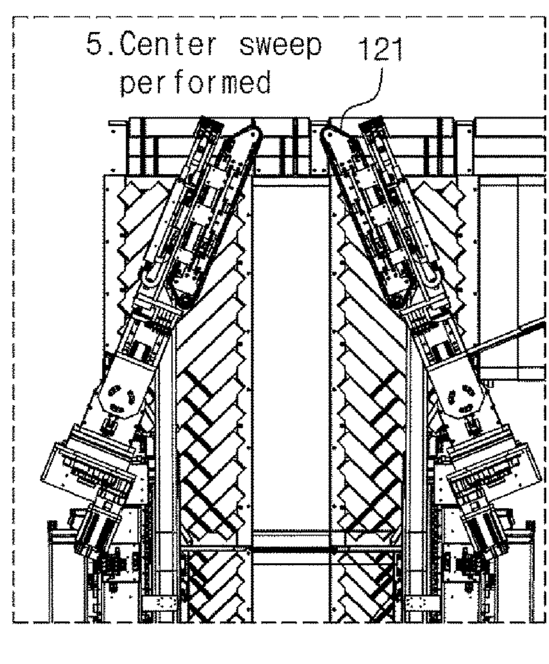
Figure 15:
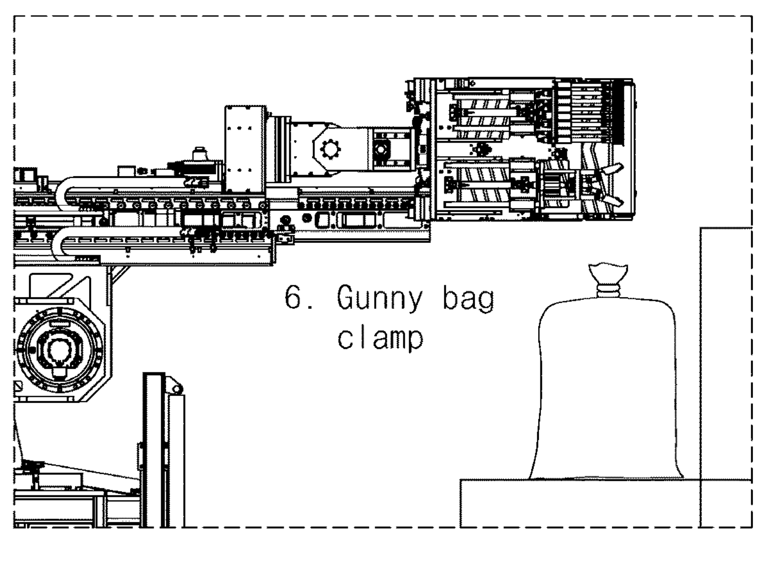
Figure 15:
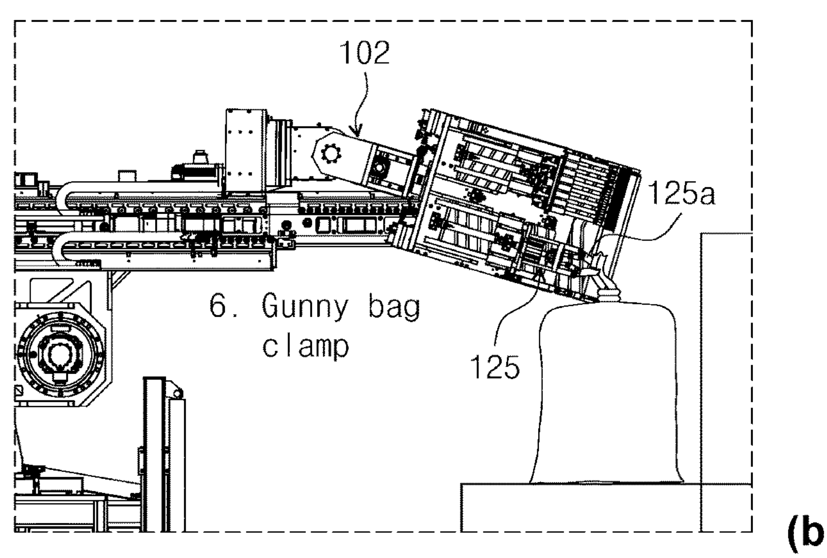
Figure 15:
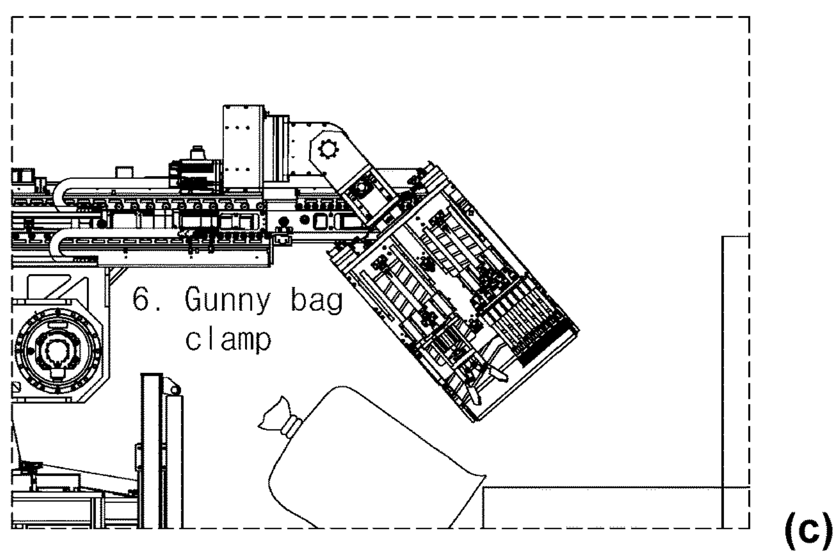
Figure 16:
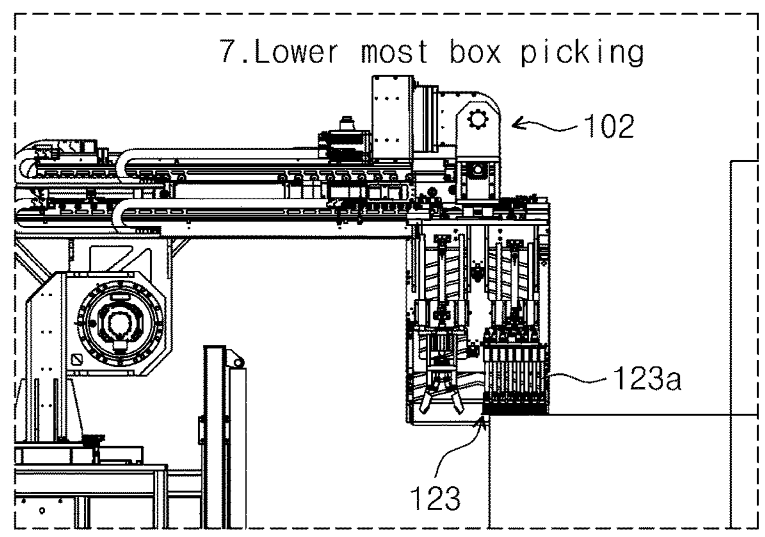
Figure 16:
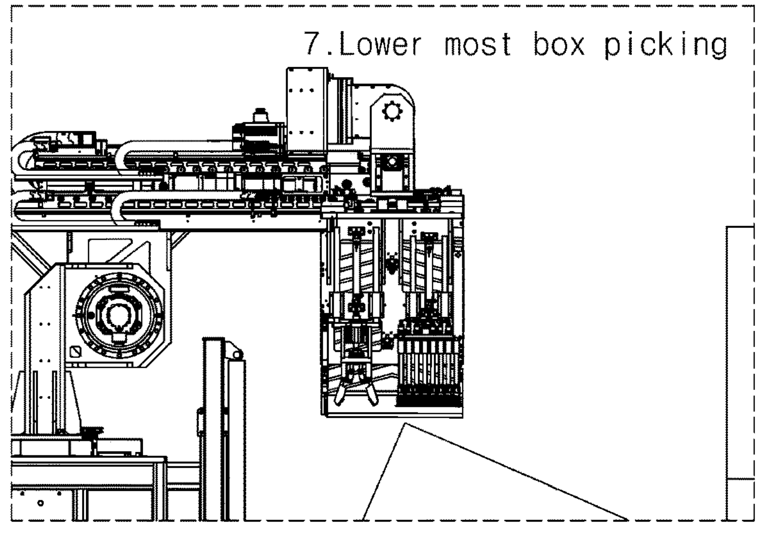

FIG. 10 is a view illustrating a recognizing operation of an automated machine for unloading cargo, according to an embodiment of the inventive concept, FIG. 11 is a view illustrating an operation for adjusting the height of the automated machine for unloading cargo according to an embodiment of the inventive concept. FIG. 12 is a view illustrating an operation of an upper end portion of the automated machine for unloading cargo, according to an embodiment of the inventive concept, and FIG. 13 is a view illustrating a down sweep mode operation of the automated machine for unloading cargo, according to an embodiment of the inventive concept. FIG. 14 is a view illustrating a side sweep mode operation of the automated machine for unloading cargo, according to an embodiment of the inventive concept. FIG. 15 is a view illustrating a clamping mode operation of the automated machine for unloading cargo according to an embodiment of the inventive concept. FIG. 16 is a view illustrating a suction mode operation of the automated machine for unloading cargo, according to an embodiment of the inventive concept.

Referring to FIG. 10, the automated machine 100 for unloading cargo may recognize the distance to the cargo, the loaded pattern of the cargo, the loaded position of the cargo, or the type of the cargo through the vision sensor. In this case, the automated machine 100 for unloading cargo may move toward the cargo based on the distance to the cargo.

The automated machine 100 for unloading cargo may sequentially unload the cargo based on the height of the loaded cargo.

Referring to FIG. 11, the automated machine 100 for unloading cargo may adjust the height of the front end portion of the conveyor device 104, based on the loaded height of the cargo. The automated machine 100 for unloading cargo may adjust the height of the front end portion of the conveyor device 104, based on the height of the cargo which is positioned at the upper most portion of the loaded cargo. In other words, since the automated machine 100 for unloading cargo starts an unloading operation with cargo positioned at the upper most portion of the loaded cargo, the height of the front end portion of the conveyor device 104 may be adjusted to the height for safely receiving the cargo positioned at the upper most portion of the loaded cargo.

Referring to FIG. 12, the automated machine 100 for unloading cargo may position the robot arm device 102 to an upper portion of the relevant cargo to unload the cargo positioned at the upper most portion of the loaded cargo. According to an exemplary embodiment, when the cargo positioned at the upper most portion of the loaded cargo has a box form, and the space for the entrance of the robot arm device 102 is ensured at the upper portion of the cargo positioned at the upper most portion, the robot arm device 102 may operate in the down sweep mode to unload the cargo positioned at the upper most portion. In this case, although the robot arm device 102 may unload cargo positioned at the upper most portion of the cargo positioned at the outer most portion of the loaded cargo may be unloaded in the down sweep mode, the inventive concept is not limited thereto.

FIG. 13 illustrates the state that the robot arm device 102 unloads the cargo positioned at the upper most portion of the loaded cargo toward the conveyor device 104 in the down sweep mode. In this case, the down sweep mode may refer to an operating mode for rotating the conveyor belt 121 for unloading toward the main body frame 108 and for sweeping down target cargo, in the state that the conveyor belt 121 for the unloading of the hand unit 113 is placed to face the target cargo above the target cargo (that is, cargo to be unloaded) (that is, the state that the bottom surface of the conveyor belt 121 for unloading faces a top surface of the target cargo above the target cargo). In this case, both of a pair of conveyor belts 121 for unloading may operate in the down sweep mode, based on the number of cargo to be unloaded in the down sweep mode or the position of the cargo to be unloaded.

FIG. 14 illustrates the state that the robot arm device 102 unloads the loaded cargo in the side sweep mode. According to an embodiment, after unloading the cargo, which is positioned at the outer most portion of the cargo positioned at the upper most portion, of the loaded cargo in the down sweep mode, the robot arm device 102 may unload cargo positioned at a middle portion of the loaded cargo in the side sweep mode. However, the inventive concept is not limited thereto, when the cargo positioned at the upper most portion of the loaded cargo has a box form, and the space for the entrance of the robot arm device 102 is ensured at the side portion of the cargo positioned at the upper most portion, the robot arm device 102 may operate in the side sweep mode and unload the cargo.

In this case, the side sweep mode may refer to an operating mode for rotating the pair of the conveyor belts 121 for unloading toward the main body frame 108 and for sweeping down target cargo, in the state that at least one target cargo is positioned between the pair of conveyor belts 121 for unloading, and placed to face the target cargo (to be unloaded) at opposite side portions of the target cargo (that is, the state that the surface of the conveyor belt 121 for unloading faces the side surface of the target cargo at the side portion of the target cargo).

In detail, the robot arm device 102 may allow the hand unit 113 to enter the side space of the loaded cargo (see FIG. 14A). Next, the robot arm device 102 may be placed to allow the pair of conveyor belts 121 for unloading of the hand unit 113 to face the side surface of the target cargo (see FIG. 14B). Next, the robot arm device 102 may rotate the pair of the conveyor belts 121 for unloading toward the main body frame 108 and sweep down the target cargo (see FIG. 14C). In this case, as the automated machine 100 for unloading cargo unloads the loaded cargo, the automated machine 100 bends the pair of robot arm devices 102 inward while consecutively operating in the side sweep mode.

FIG. 15 illustrates the state that the robot arm device 102 unloads the loaded cargo through the clamping mode. According to an embodiment, the automated machine 100 for unloading cargo may operate the robot arm device 102 in the clamping mode depending on the type of cargo to be unloaded. For example, when the type of the cargo to be unloaded is cargo to be picked up through the clamping section 125, such as a gunny bag or pouch, the automated machine 100 for unloading cargo may operate the robot arm device 102 in the clamping mode.

In detail, when the type of the cargo is the gunny bag (see FIG. 15A), the robot arm device 102 may pick up the target cargo through the clamp unit 125*a* of the clamp driving section 125 (see FIG. 15B) after moving the hand unit 113 to the target cargo. In this case, the clamping section 125*a* may move the clamping section 125*a* forward based on the distance to the target cargo. Next, the robot arm device 102 may unload the target cargo by pulling down the target cargo (see FIG. 15C).

FIG. 16 illustrates the state that the robot arm device 102 unloads the loaded cargo in the suction mode. According to an embodiment, the robot arm device 102 may unload the cargo in the suction mode, based on at least one of the loaded height of the cargo and the type of the cargo. For example, when the target cargo is positioned at the lower most portion or the upper most portion, and the cargo has the box form, the robot arm device 102 may unload the target cargo in the suction mode. FIG. 16 illustrates that the cargo is unloaded in the suction mode when the target cargo has the form of a box positioned at the lower most portion.

In detail, the robot arm device 102 may suction the target cargo through the suction pad unit 123*a* of the suction unit 123 (see FIG. 16A) In this case, the robot arm device 102 may move the suction pad unit 123*a* forward based on the distance to the target cargo. Next, the robot arm device 102 may move the target cargo onto the conveyor device 104 in the state that the target cargo is suctioned (see FIG. 16B). Next, the robot arm device 102 may unload the target cargo from the conveyor device 104 by separating the target cargo from the suction pad unit 123*a* (see FIG. 16C).

According to an embodiment of the inventive concept, the automated machine 100 for unloading cargo has a pair of robot arm devices 102 which is rotatable or movable in multiple axes, and the robot arm device 102 includes the conveyor belt 121 for unloading, the suction unit 123, and the clamp unit 125. Accordingly, as the robot arm device 102 may operate in various unloading modes such as the down sweep mode, the side sweep mode, the suction mode, and the clamping mode, depending on the position of the loaded cargo, the loaded pattern of the cargo, and the type of the cargo, such that the loaded cargo may be easily and rapidly unloaded.

The above description has been made for the illustrative purpose. Furthermore, the above-mentioned contents describe the exemplary embodiment of the inventive concept, and the inventive concept may be used in various other combinations, changes, and environments. That is, the inventive concept can be modified and corrected without departing from the scope of the inventive concept that is disclosed in the specification, the equivalent scope to the written disclosures, and/or the technical or knowledge range of those skilled in the art. The written embodiment describes the best state for implementing the technical spirit of the inventive concept, and various changes required in the detailed application fields and purposes of the inventive concept can be made. The written embodiment describes the best state for implementing the technical spirit of the inventive concept, and various changes required in the detailed application fields and purposes of the inventive concept can be made. Furthermore, it should be construed that the attached claims include other embodiments.

The invention claimed is:

1. An automated machine for unloading cargo loaded from a cargo box, the automated machine comprising:
- a main body frame; and
- a pair of robot arm devices provided at opposite side portions of the main body frame,
- wherein each robot arm device includes:
- an arm unit provided at one of the opposite side portions of the main body frame to be rotatable in a multi-axis and movable forward and rearward; and
- a hand unit linked to the arm unit to unload the cargo,
- wherein the hand unit includes:
  - an unloading conveyor belt provided at one side portion of the hand unit to sweep down the loaded cargo, as the unloading conveyor belt rotates toward the main body frame;
  - a suction unit provided at an opposite side portion of the hand unit to suction and unload the loaded cargo; and
  - a clamp unit provided at the opposite side portion of the hand unit to pick up and unload the loaded cargo,
- wherein each robot arm device determines one unloading mode of a down sweep mode, a side sweep mode, a suction mode, and a clamping mode, based on at least one of a distance to the cargo, a loaded pattern of the cargo, a loaded position of the cargo, and a type of the cargo,
- wherein each robot arm device rotates the unloading conveyor belt toward the main body frame and sweeps down the cargo, in a state that the unloading conveyor belt is placed to face the cargo above the cargo, in the down sweep mode.

2. The automated machine of claim 1, wherein the hand unit further includes:
- a roughness pattern part formed on a surface of the unloading conveyor belt to increase frictional force with the loaded cargo.

3. The automated machine of claim 1, wherein the suction unit and the clamp unit are arranged vertically at the opposite side portion of the hand unit, and provided in a longitudinal direction of the hand unit.

4. The automated machine of claim 3, wherein the suction unit includes:
- a suction pad unit including at least one suction cup provided at an end portion of the suction pad unit to vacuum-suction the cargo, and provided in the longitudinal direction of the hand unit; and
- a suction driving unit linked to the suction pad unit and provided to move the suction pad unit forward and rearward.

5. The automated machine of claim 3, wherein the clamp unit includes:
- a clamping section provided in a form of a tong such that an end portion of the clamping section picks up the cargo and provided in a longitudinal direction of the hand unit; and
- a clamp driving section linked to the clamping section and provided to move the clamping section forward and rearward.

6. The automated machine of claim 1, wherein the pair of robot arm devices rotate a pair of the unloading conveyor belts, respectively, toward the main body frame and sweep down the cargo, in a state that the loaded cargo is interposed between the pair of the unloading conveyor belts, and the pair of the unloading conveyor belts are placed to face the cargo at opposite side portions of the cargo, in the side sweep mode.

7. The automated machine of claim 6, wherein the pair of robot arm devices are bent inward while consecutively operating in the side sweep mode, as cargoes are unloaded between the pair of the unloading conveyor belts in the side sweep mode.

8. The automated machine of claim 1, wherein each robot arm device is provided to unload the cargo, after suctioning the cargo through the suction unit in the suction mode.

9. The automated machine of claim 1, wherein each robot arm device is provided to unload the cargo, after picking up the cargo through the clamping unit in the clamping mode.

10. A robot arm device to unload cargo loaded in a cargo box, the robot arm device comprising:
- an arm unit provided to rotate in multiple axes and to move forward and rearward; and
- a hand unit linked to the arm unit to unload the cargo,
- wherein the hand unit includes:
  - an unloading conveyor belt provided at one side portion of the hand unit to sweep down the loaded cargo, as the unloading conveyor belt rotates toward the main body frame;
  - a suction unit provided at an opposite side portion of the hand unit to suction and unload the loaded cargo; and
  - a clamp unit provided at the opposite side portion of the hand unit to pick up and unload the loaded cargo,
- wherein the robot arm device determines one unloading mode of a down sweep mode, a side sweep mode, a suction mode, and a clamping mode, based on at least one of a distance to the cargo, a loaded pattern of the cargo, a loaded position of the cargo, and a type of the cargo,
- wherein the robot arm device rotates the unloading conveyor belt toward the main body frame and sweeps down the cargo, in a state that the unloading conveyor belt is placed to face the cargo above the cargo, in the down sweep mode.

11. An automated machine for unloading cargo loaded from a cargo box, the automated machine comprising:
- a main body frame; and
- a pair of robot arm devices provided at opposite side portions of the main body frame,
- wherein each robot arm device includes:

an arm unit provided at one of the opposite side portions of the main body frame to be rotatable in a multi-axis and movable forward and rearward; and a hand unit linked to the arm unit to unload the cargo, wherein the hand unit includes:

an unloading conveyor belt provided at one side portion of the hand unit to sweep down the loaded cargo, as the unloading conveyor belt rotates toward the main body frame;

a suction unit provided at an opposite side portion of the hand unit to suction and unload the loaded cargo; and a clamp unit provided at the opposite side portion of the hand unit to pick up and unload the loaded cargo, wherein each robot arm device determines one unloading mode of a down sweep mode, a side sweep mode, a suction mode, and a clamping mode, based on at least one of a distance to the cargo, a loaded pattern of the cargo, a loaded position of the cargo, and a type of the cargo, wherein the pair of robot arm device rotate a pair of the unloading conveyor belts, respectively, toward the main body frame and sweep down the cargo, in a state that the loaded cargo is interposed between the pair of the unloading conveyor belts, and the pair of the unloading conveyor belts are placed to face the cargo at opposite side portions of the cargo, in the side sweep mode.

12. The automated machine of claim 11, wherein the pair of robot arm devices are bent inward while consecutively operating in the side sweep mode, as cargoes are unloaded between the pair of the unloading conveyor belts in the side sweep mode.

* * * * *